United States Patent Office.

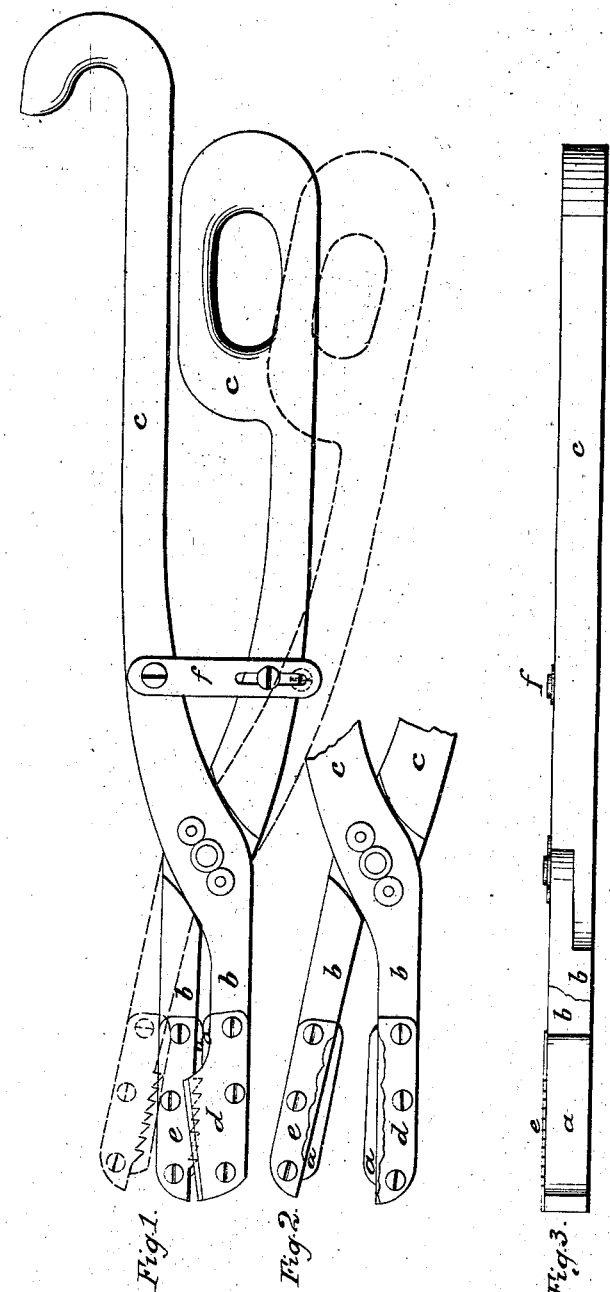

J. F. SINGLE, OF PAINESVILLE, OHIO, (WILLIAM PETTINGELL, ADMINISTRATOR.)

Letters Patent No. 78,241, dated May 26, 1868.

---

IMPROVEMENT IN IMPLEMENT FOR HARVESTING GRAPES.

---

The Schedule referred to in these Letters Patent and making part of the same.

---

TO ALL WHOM IT MAY CONCERN:

Be it known that I, J. F. SINGLE, of Painesville, county of Lake, and State of Ohio, have invented a new and useful Implement for Harvesting Grapes; and I do hereby declare that the following is a full and exact description thereof, reference being had to the accompanying drawings, in which—

Figure 1 is a top view of the said implement.

Figure 2 represents the jaws of the same, with portions of the shear edged, and serrated blades removed, to expose the elastic pads hereafter mentioned; and Figure 3 a side elevation, with a portion of one of the jaws removed, so as to show the broad inside surface of one of the said elastic pads.

The same letters refer to like parts in all the drawings.

This invention relates to an implement designed for the use of grape-growers, and is so arranged that the picker, with one hand only, can sever the cluster from the vine, and hold it by the same until deposited in the gathering-basket, his other hand being at liberty to be used for any needed purpose, as holding or lifting up the vine-branches, steadying himself while reaching out or overhead, &c., &c.; besides, the handling of the fruit is entirely avoided, a feature that will be appreciated by the grape-grower when harvesting the fine and choice varieties for table use.

The following description will enable others to construct and use the same.

A pair of handles, $c$ $c$, are constructed with jaws $b$ $b$, and are pivoted so as to operate like forceps or pliers, as shown in fig. 1. The inside of the said jaws is constructed with flat surfaces, on each of which are secured, in any convenient manner, India-rubber or other elastic or spring pads, as shown at $a$ $a$, fig. 2.

On the upper surfaces of the said jaws are secured two blades, one a shear-edged cutting-blade, $d$, and the other a blade or plate, $e$, provided with any number of serrated projections, as exhibited in fig. 1. Both are secured to the jaws by means of screws. The edge of the blade $d$ is secured in position so as to pass entirely beyond the serrated projections of the other blade when the handles are closed, the pads $a$ $a$ being fully compressed.

$f$ is a slotted stop-bar. It is screwed loosely to one of the handles, $c$, and a stop-pin passed through the said slot into the other handle, as seen.

The body of this implement is of such form that it can be made of any hard wood, as beech, maple, &c., and will thus be light in the hand of the operator. It can, however, be constructed of metal, if so desired.

The form of the said described implement, it will be seen, is that of the forceps or pliers, this being the most compact, occupying the least room, so that it can be readily inserted between narrow spaces to reach the fruit; besides, the broad surfaces inside the jaws admit of correspondingly broad pads, which will present more holding-surface to the stem.

Pads of India-rubber I regard as the best, as this material is well adapted for the peculiar hold and yielding elasticity required by the implement.

The operation of the above-described implement is thus: The jaws $b$ $b$ are parted by opening the handles $c$ $c$, said opening being limited by the setting of the stop-bar $f$, so as to prevent the stem of the cluster from slipping beyond the proper cutting-point of the blades $d$ and $e$. It will be seen that the pads $a$ $a$, by their elasticity, will begin to hold the stem just before the cutting-blade operates, and that the jaws retain their hold of the cluster after the stem is severed, until released by opening the handles.

The intention of the serrated blade $e$ is to hold the stem firmly while the cutter-blade operates. This provision is a necessary one, as oftentimes the stem is woody and tough, and would be apt to slide or slip along plain-edged blades.

What I claim as my invention, and desire to secure by Letters Patent, is—

1. Constructing the described implement in the manner of forceps or pliers, and providing the broad jaws thereof with correspondingly broad pads or cushions, of an elastic nature, as India rubber, so as to operate substantially in the manner and for the purposes herein specified.

2. I claim the shear-edged blade $d$ and serrated blade $e$, in combination with the jaws $b\ b$ and handles $c\ c$, operating so as to sever the stem of the cluster with certainty, as herein set forth.

3. I claim the combination of the several parts of the described implement, to wit, pads $a\ a$, jaws $b\ b$, shear-edged blade $d$, serrated blade $e$, slotted stop-plate $f$, and handles $c\ c$, all arranged so as to effect the purposes herein set forth.

J. F. SINGLE.

Witnesses:
WM. PETTINGELL,
J. PETTINGELL.